US011920509B2

(12) United States Patent
Lewis, Jr. et al.

(10) Patent No.: US 11,920,509 B2
(45) Date of Patent: Mar. 5, 2024

(54) BYPASS SYSTEM FOR ENGINE STARTUP

(71) Applicant: Cummins Inc., Columbus, IN (US)

(72) Inventors: Rick Vaughan Lewis, Jr., Franklin, IN (US); Yilun Liu, Columbus, IN (US); Jingxuan Liu, Columbus, IN (US); Trideep Singh, Bhilai (IN); Carlos Alcides Lana, Columbus, IN (US); Stephen Cox, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/808,194

(22) Filed: Jun. 22, 2022

(65) Prior Publication Data

US 2022/0316385 A1 Oct. 6, 2022

Related U.S. Application Data

(63) Continuation of application No. PCT/US2019/069036, filed on Dec. 31, 2019.

(51) Int. Cl.

| | |
|---|---|
| ***F02B 1/04*** | (2006.01) |
| ***F02B 33/44*** | (2006.01) |
| ***F02B 37/16*** | (2006.01) |
| ***F02D 41/00*** | (2006.01) |

(52) U.S. Cl.
CPC .............. *F02B 1/04* (2013.01); *F02B 33/446* (2013.01); *F02B 37/16* (2013.01); *F02D 41/0007* (2013.01)

(58) Field of Classification Search
CPC ........... F02B 37/16; F02B 33/446; F02B 1/04
See application file for complete search history.

(56) References Cited

U.S. PATENT DOCUMENTS

| | | | |
|---|---|---|---|
| 4,154,060 | A | 5/1979 | Deprez et al. |
| 4,716,734 | A | 1/1988 | Nakao et al. |
| 5,365,893 | A | 11/1994 | Wissmann et al. |
| 5,477,839 | A | 12/1995 | Oshima et al. |
| 5,676,101 | A | 10/1997 | Kawai et al. |
| 5,704,323 | A | 1/1998 | Gardell et al. |
| 6,234,141 | B1 | 5/2001 | Kerns et al. |
| 7,128,035 | B2 | 10/2006 | Lancaster et al. |
| 7,152,588 | B2 | 12/2006 | Corba |
| 7,607,293 | B2 | 10/2009 | Tamai et al. |

(Continued)

FOREIGN PATENT DOCUMENTS

| | | | |
|---|---|---|---|
| AT | 508010 B1 * | 10/2010 | .......... F02B 29/0418 |
| CN | 105324564 A * | 2/2016 | .......... F02B 29/0418 |

(Continued)

OTHER PUBLICATIONS

International Search Report and Written Opinion, PCT Appln. No. PCT/US19/69036, dated Apr. 23, 2020, 11 pgs.

(Continued)

*Primary Examiner* — Ngoc T Nguyen
(74) *Attorney, Agent, or Firm* — Taft Stettinius & Hollister LLP

(57) ABSTRACT

Systems, methods and apparatus are disclosed for providing reduced engine start times for a fumigation type internal combustion engine. A bypass is provided that directly connects the air-fuel mixer upstream of the compressor to the intake manifold, providing the air-fuel mixture to the intake manifold during engine startup.

20 Claims, 6 Drawing Sheets

(56) References Cited

U.S. PATENT DOCUMENTS

| | | | |
|---|---|---|---|
| 8,312,710 B2 | 11/2012 | Sumilla et al. | |
| 8,340,885 B2 | 12/2012 | Baldauf et al. | |
| 9,022,007 B2 | 5/2015 | Pursifull et al. | |
| 9,328,702 B2 | 5/2016 | Pursifull et al. | |
| 10,415,599 B2 | 9/2019 | Sun et al. | |
| 2007/0261654 A1 | 11/2007 | Butcher et al. | |
| 2012/0204570 A1 | 8/2012 | Herdin | |
| 2013/0111898 A1 | 5/2013 | Dale | |
| 2013/0276756 A1 | 10/2013 | Leone et al. | |
| 2015/0114339 A1 | 4/2015 | Sellnau et al. | |
| 2017/0022954 A1 | 1/2017 | Xiao et al. | |
| 2018/0135571 A1* | 5/2018 | Fuchs | F02B 29/0412 |
| 2019/0257242 A1 | 8/2019 | Thalhauser et al. | |
| 2019/0331020 A1 | 10/2019 | Craig et al. | |

FOREIGN PATENT DOCUMENTS

| | | | |
|---|---|---|---|
| EP | 3530918 A1 | | 8/2019 |
| KR | 20130083607 A | * | 7/2013 |

OTHER PUBLICATIONS

European Extended Search Report, EP Appln. No. 19958694.2, dated Jul. 7, 2023, 6 pgs.

* cited by examiner

BYPASS SYSTEM FOR ENGINE STARTUP

CROSS-REFERENCE TO RELATED APPLICATIONS

The present application is a continuation of PCT Application No. PCT/US19/69036 filed on Dec. 31, 2019, which is incorporated herein by reference.

BACKGROUND

Fumigation type internal combustion engines receive a pressurized air-fuel mixture at the combustion chambers of the cylinders for engine operation. This arrangement creates a delay in engine starting during cranking of the engine since the air fuel mixture must travel from the mixer to a compressor for compression, then through a charge air cooler, and then through an intake throttle, in order to reach the intake manifold for distribution to the cylinders. As a result, starting of the engine requires a longer duration and more cranking than, for example, a direct injection engine.

Certain applications for fumigation type engines employing compressed air-fuel mixtures benefit from faster start times, such as engines for generators. In addition, many fumigation type engines employ larger batteries, electric compressors, high-speed starters, compressors, and/or other components to reduce engine start times. Therefore, further technological developments are desirable in this area.

SUMMARY

Unique systems, methods and apparatuses are disclosed for providing reduced engine startup times for a fumigation type internal combustion engine. A bypass flow path is provided that bypasses a compressor flow path, and directly connects the air-fuel mixer upstream of the compressor to the intake manifold, providing the air-fuel mixture directly to the intake manifold during engine startup. A valve may be provided in the bypass flow path to open and close the bypass flow path. The need for electric compressors, high-speed starters, larger batteries, and other such components for faster engine startup may therefore be eliminated.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
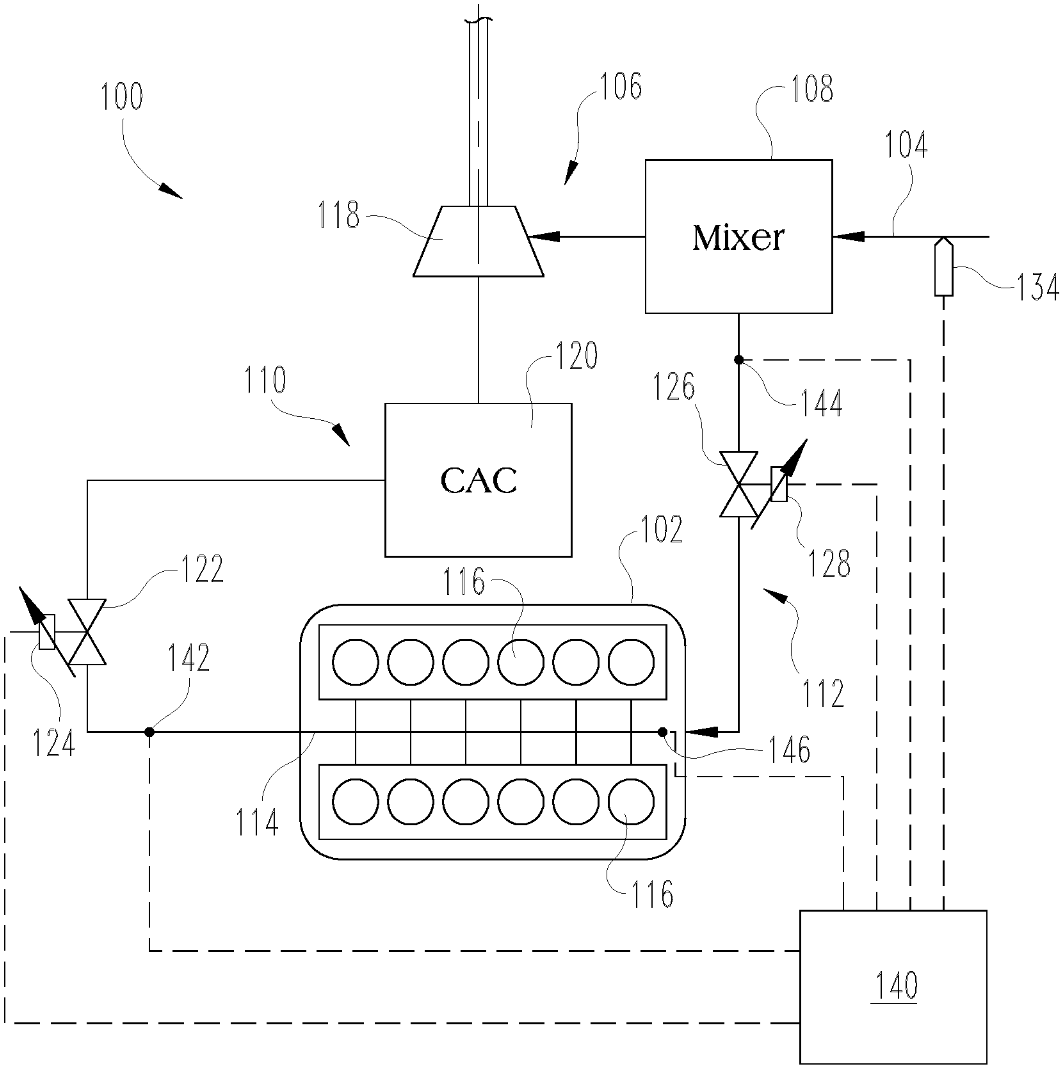
FIG. 1 is a schematic diagram of an internal combustion engine system including an intake system with a compressor flow path with an intake throttle and a charge air cooler, and a compressor bypass flow path for engine startup.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an internal combustion engine system 100 for controlling a flow of an air-fuel mixture 104 is schematically depicted. The system 100 includes an internal combustion engine 102 which may be a fumigation type of engine, such as a natural gas operated spark-ignited engine. However, the present disclosure may have application with any type of engine in which fuel is injected upstream of the intake manifold and more rapid engine startup is desired.

The engine 102 includes an intake system 106 that includes a first, compressor flow path 110 and a second, compressor bypass flow path 112. As discussed further below, the compressor bypass flow path 112 is employed for engine startup, while the compressor flow path 110 is employed during other engine operating conditions after engine startup.

Each of the flow paths 110, 112 connects a mixer 108 that mixes the air-fuel mixture 104 to an intake manifold 114. Intake manifold 114 distributes the air-fuel mixture 104 to a plurality of cylinders 116 to initiate engine startup and for subsequent combustion during engine operations. In the illustrated embodiment, twelve cylinders 116 are provided with six cylinders in each of two cylinder banks. However, any number of cylinders 116 and cylinder arrangements in one or more cylinder banks is contemplated.

The compressor flow path 110 includes a compressor 118, a charge air cooler (CAC) 120, and an intake throttle (IAT) 122 between mixer 108 and intake manifold 114. The compressor 118 operates via energy from a motor or a turbine to compress the air-fuel mixture 104 upstream of intake manifold 114. The compressed air-fuel mixture 104 is sometimes called charge air, charge gases, charge flow, intake air, or other terms, none of which are limiting.

The compressed air-fuel mixture 104 may pass through charge air cooler 120 before being received by the engine 102. The charge air cooler 120 helps provide for increased air density for the compressed air-fuel mixture 104 in the engine 102, although the cooling reduces the pressure of the compressed air-fuel mixture 104. The charge air cooler 120 may be provided as shown, or arranged to provide after-cooling, two stage after-cooling, or any other charge air cooler arrangement. The presence and operations of a charge air cooler, if present, are well understood and not important to the operations of the compressor bypass for engine startup.

The compressor flow path 110 includes the intake throttle 122 for controlling the flow of the compressed air-fuel mixture 104 to the intake manifold 114 of engine 102. Intake throttle 122 can include a throttle actuator 124 connected to a controller 140 that controls an opening and closing of intake throttle 122 to provide a desired flow amount of the compressed air-fuel mixture 104 to the intake manifold 114 of engine 102.

The compressor bypass flow path 112 includes a bypass valve 126 for controlling the flow of the un-compressed air-fuel mixture 104 to the intake manifold 114 of engine 102 in a manner that bypasses the compressor 118. Bypass valve 126 can include a valve actuator 128 connected to controller 140 that controls an opening and closing of bypass valve 126 to provide a desired flow amount of the un-compressed, non-cooled air-fuel mixture 104 to the intake manifold 114 of engine 102 during engine startup.

Certain features such as shut-off valves, a turbine, multiple turbochargers and/or multiple compressors, an exhaust gas recirculation system, aftertreatment components, intake air filter, intake air components, etc. may be present or not in system 100. The presence and operations of such features is not limiting and not all possible features of system 100 are depicted to enhance the clarity of the description.

Figure 2A:
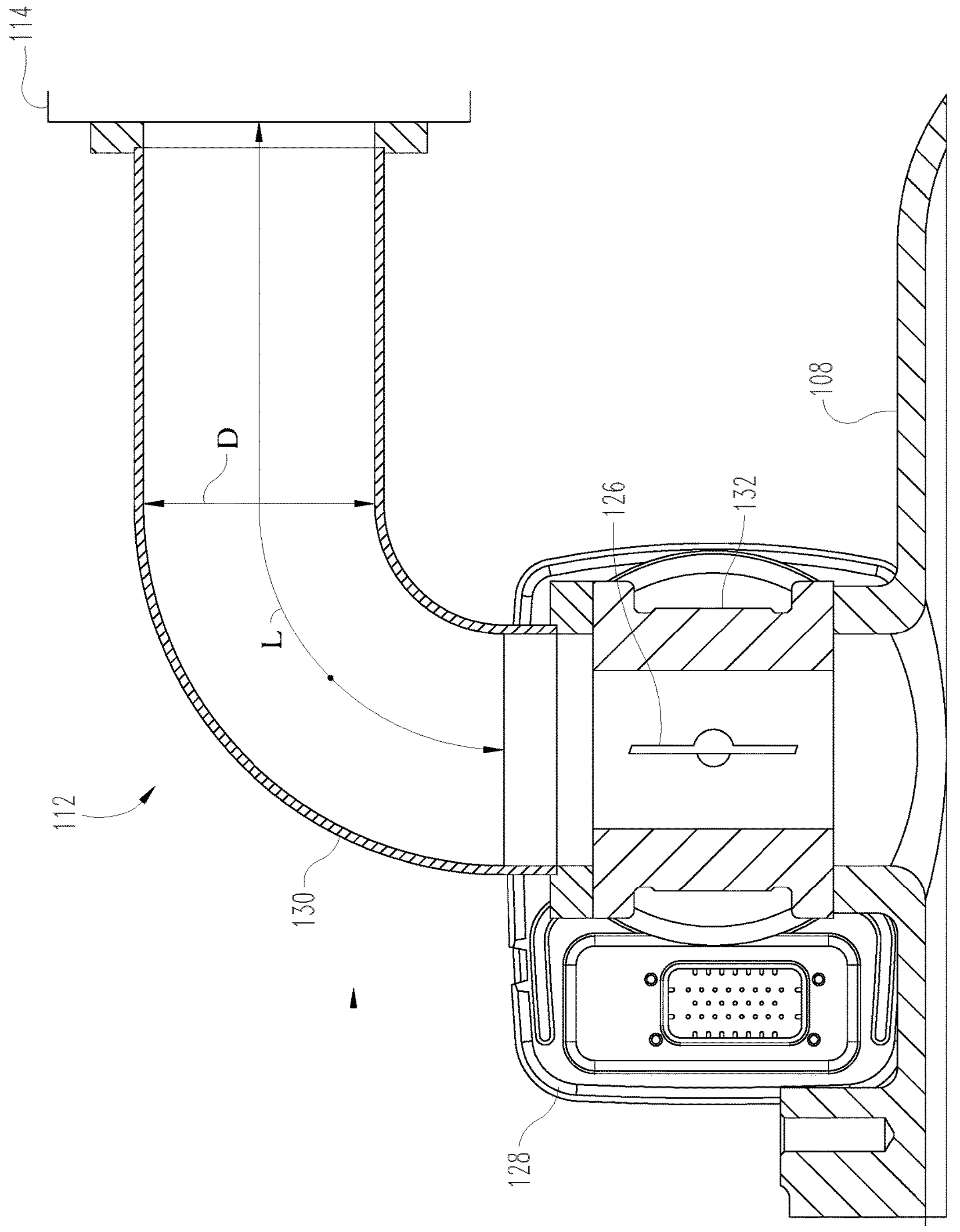
FIG. 2A is a cross-sectional view of one embodiment of a compressor bypass flow path.

Referring to FIG. 2A, there is shown a cross-section of one embodiment of compressor bypass flow path 112. The illustrated embodiment includes a conduit 130 that forms a bend connecting the mixer 108 to the intake manifold 114. The conduit 130 forms a 90 degree bend in the illustrated embodiment, and is connected to a flanged housing 132 of bypass valve 126. The flanged housing 132 is connected directly to mixer 108 on the side opposite to conduit 130.

It is contemplated that the overall length L of conduit 130 is as small as possible to minimize the transport time of the air-fuel mixture 104 to the nearest cylinders 116 connected to intake manifold 114. In certain specific embodiments, the length L ranges from 400 mm to 1000 mm. Other lengths, however, are not precluded in other embodiments. The cross-sectional dimension D of conduit 130 is also contemplated to be large enough to provide the desire mass flow of the air-fuel mixture 104 to achieve rapid engine startup. In certain embodiments, dimension D is a diameter of at least 60 mm. In the illustrated embodiment, the conduit 130 forms a bend of 90 degrees, but bends at other angles, including conduits 130 with no bend, are contemplated.

Figure 2C:
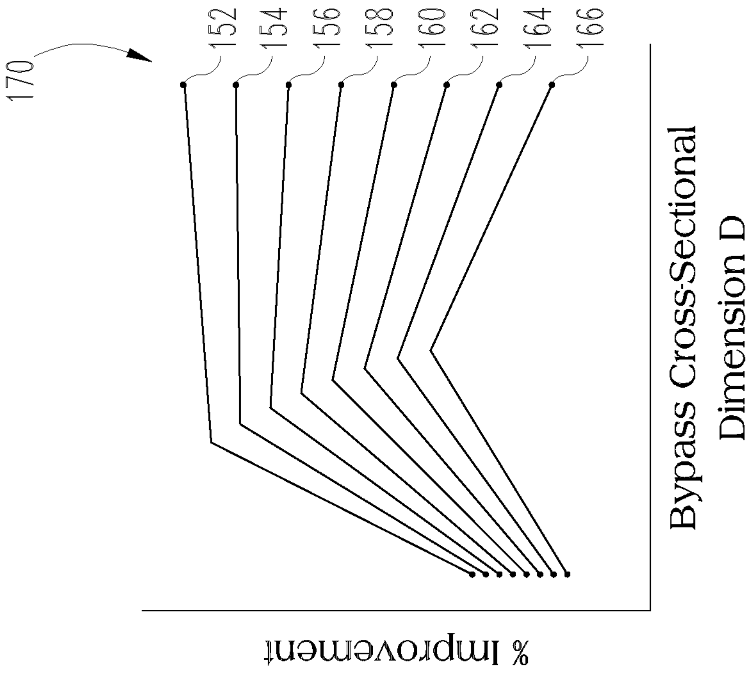
FIGS. 2B and 2C are graphs showing selections of compressor bypass length and diameter.
Figure 2B:
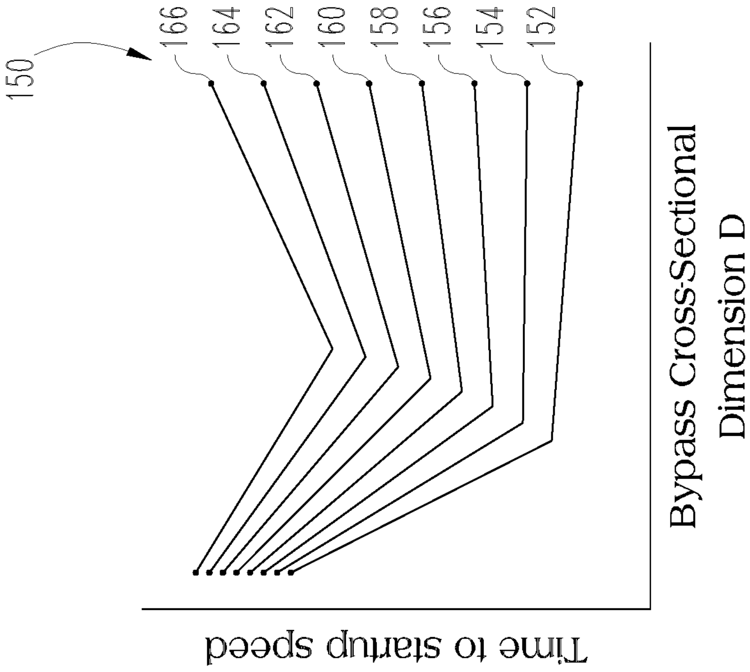

Referring to FIG. 2B, a graph is shown that includes a representative scatterplot 150 for time to an engine startup speed (y-axis) for bypass flow paths 112 of various cross-sectional dimensions D (x-axis) and pipe lengths L 152, 154, 156, 158, 160, 162, 164, 166. In FIG. 2C, a graph is shown that includes a representative scatterplot 170 for percentage improvement in a baseline startup time (for example, with no bypass flow path 112) to an engine startup speed (y-axis) for bypass flow paths 112 of various cross-sectional dimensions D (x-axis) and pipe lengths L 152, 154, 156, 158, 160, 162, 164, 166. The length L and cross-sectional dimension D of the conduit 130 can be selected using such scatterplots in order to provide the desired performance within the available space.

The system 100 includes controller 140 structured to perform certain operations to control the intake throttle 122, the bypass valve 126, and a fuel injector 134. Fuel injector 134 is operable to provide a desired fuel amount from a fuel source into the intake air to form the air-fuel mixture 104. Injector 134 can be any device that is operable to control fuel flow. In certain embodiments, the controller 140 forms a portion of a processing subsystem including one or more computing devices having memory, processing, and communication hardware. The controller may be a single device or a distributed device, and the functions of the controller may be performed by hardware and/or by a computer executing instructions stored in non-transient memory on one or more computer readable media.

In certain embodiments, the controller 140 includes one or more circuits structured to functionally execute the operations of the controller. The description herein including circuits emphasizes the structural independence of the aspects of the controller 140, and illustrates one grouping of operations and responsibilities of the controller 140. Other groupings that execute similar overall operations are understood within the scope of the present application. Circuits may be implemented in hardware and/or by a computer executing instructions stored in non-transient memory on one or more computer readable media, and circuits may be distributed across various hardware or computer based components.

Example and non-limiting implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements. In FIG. 1 there are shown sensors 142, 144, 146 connected to controller 140 to provide values indicative of air-fuel ratios at the corresponding intake throttle 122, mixer 108, and intake manifold 114 locations of system 100.

The listing herein of specific implementation elements is not limiting, and any implementation element for any circuit or controller described herein that would be understood by one of skill in the art is contemplated herein. The circuits and controllers herein, once the operations are described, are capable of numerous hardware and/or computer based implementations, many of the specific implementations of which involve mechanical steps for one of skill in the art having the benefit of the disclosures herein and the understanding of the operations of the circuits and the controllers provided by the present disclosure.

Certain operations described herein include operations to interpret or determine one or more parameters. Interpreting or determining, as utilized herein, includes an operation to have the value made available by any method known in the art, including at least receiving the value from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any method known in the art (e.g. from an operator input), receiving a value by which the interpreted or determined parameter can be calculated, and/or by referencing a default value that is interpreted or determined to be the parameter value.

The schematic flow diagrams and related descriptions which follow provide illustrative embodiments of procedures for controlling intake throttle 122, bypass valve 126, and injector 134 in response to an engine startup condition and in response to subsequent engine operation. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product includes instructions causing the computer to execute one or more of the operations, or to issue commands to other devices to execute one or more of the operations.

Figure 3:
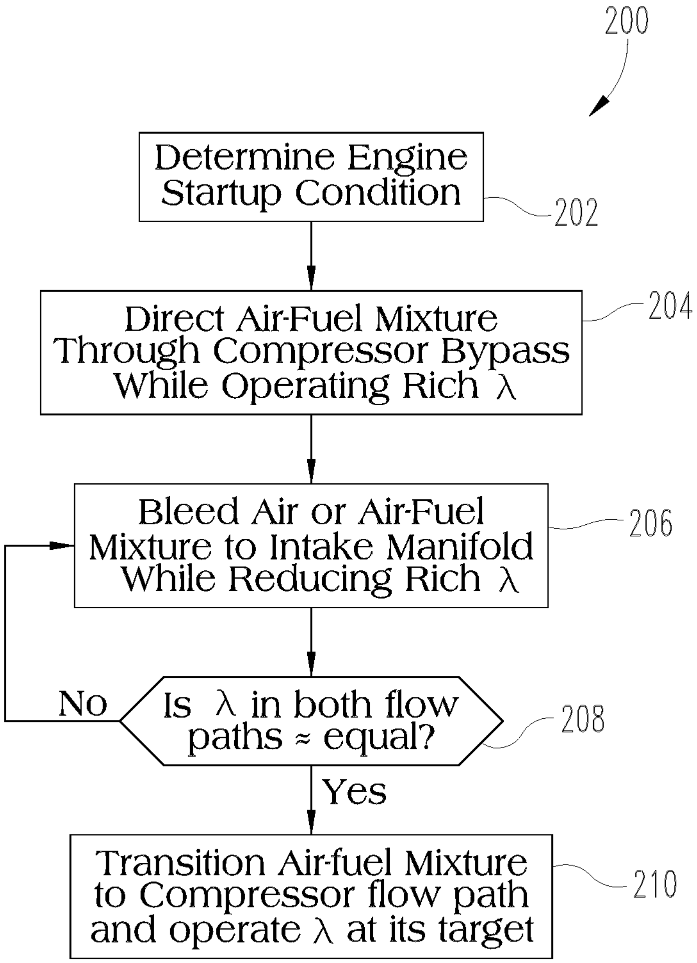
FIG. 3 is a flow diagram for an engine startup procedure utilizing a compressor bypass flow path.

FIG. 3 is a flow diagram of one embodiment of a procedure 200 for controlling the flow of the air-fuel mixture 104 for engine startup and then to transition for subsequent engine operation. Procedure 200 includes an operation 202 to determine an engine startup condition in response to one or more inputs. The engine startup can be initiated, for example, automatically by controller 140 in response to one or more inputs, and/or manually by an operator input.

In response to the engine startup condition, procedure 200 includes an operation 204 to direct the air-fuel mixture 104 through the compressor bypass flow path 112 while operating the fuel injector 134 to provide a rich air-fuel ratio (λ) condition. For example, the compressor bypass valve 126 can be moved to an open position (if necessary) with a bypass valve actuator command from controller 140 to bypass valve actuator 128. The intake throttle 122 can be moved to a closed position (if necessary) to provide a small opening at the beginning of the engine startup in response to an intake throttle actuator command from controller 140 to intake throttle actuator 124. Therefore, the uncompressed air-fuel mixture 104 travels a much shorter route to intake manifold 114 through bypass flow path 112 and provides the air-fuel mixture 104 to the nearest cylinders 116 to facilitate a more rapid engine startup than can be achieved through the compressor flow path 110.

The rich air-fuel mixture 104 may compensate for the residual air pocket in the intake manifold 114 such that the actual air-fuel ratio of the mixture arriving at the intake manifold 114 is close to a predefined target. The rich air-fuel mixture 104 may also reduce transport delay of the air-fuel mixture 104 from the mixer 108 to the intake manifold 114 for both flow paths 110, 112. It should be understood, however, that a rich air-fuel mixture 104 is just one possible solution.

Procedure 200 continues at operation 206 to bleed air or air-fuel mixture 104 from intake throttle 122 to intake manifold 114 while reducing the air-fuel ratio from its initial rich λ condition. Controller 140 can provide an intake throttle actuator command to intake throttle actuator 124 to partially open intake throttle 122 from its closed or partially closed position. This allows the air-fuel ratio λ in compressor flow path 110 to gradually increase to correspond to, or be within a predetermined range of, the air-fuel ratio λ in bypass flow path 112 such that stable combustion in cylinders 116 is provided during the change in flow paths for transport of the air-fuel mixture 104.

Procedure 200 continues at conditional 208 to determine if the air-fuel ratio λ in the flow paths 110, 112 is approximately equal, or within a predetermined range of one another, so that stable combustion can be achieved by changing flow paths. If conditional 208 is NO, procedure 200 returns to operation 206. If conditional 208 is YES, procedure 200 continues at operation 210 to transition the air-fuel mixture 104 to compressor flow path 110 and operate the air-fuel mixture λ at its target. Transitioning the air-fuel mixture 104 to compressor flow path 110 can include closing the bypass valve 126 with a bypass valve command to bypass valve actuator 128. Fueling is then provided by injector 134 to operate engine 102 at stoichiometric or as needed for combustion by engine 102.

Figure 4:
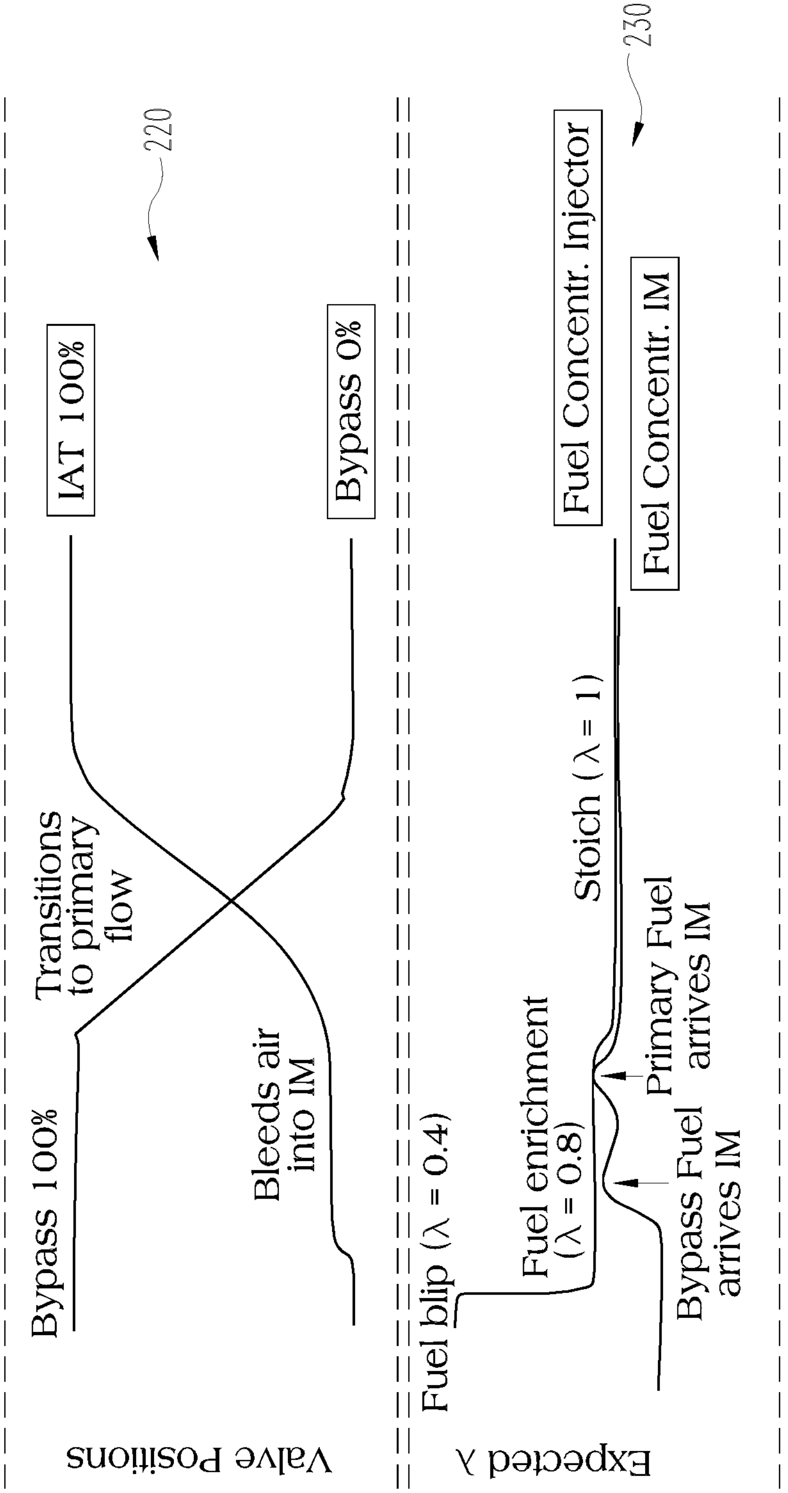
FIG. 4 is a graphical illustration of the procedure of FIG. 3.

FIG. 4 provides a graphical illustration of one possible implementation of procedure 200. As shown in graph 220, which shows intake throttle and bypass valve positions over time during the engine startup, the bypass valve 126 transitions from a fully open position (100%) at initial startup to a fully closed position (0%) when startup is complete. The intake throttle 122 transitions from a closed or substantially closed position at initial startup, to a small increase in opening to bleed air into the intake manifold 114 immediately after startup is initiated, and then to a fully open position (100%) once the engine 102 is started.

Graph 230 of FIG. 4 shows the expected air-fuel ratio λ over time at the injector 134 and at the intake manifold 114. Initially the air-fuel ratio λ is rich, such as at a λ=0.4, when the engine startup is initiated and the air-fuel mixture is directed through bypass flow path 112 to intake manifold 114. The fuel enrichment continues during startup but in a less rich condition, such as at a λ=0.8, as the compressed air-fuel mixture 104 is bled through the compressor flow path 110 until the air-fuel mixture 104 from the compressor flow path 110 also reaches intake manifold 114. When the air-fuel ratios from both flow paths 110, 112 are substantially equal or within a predetermined threshold of one another at the intake manifold 114, then bypass valve 126 is closed and fueling continues through compressor flow path 110 at stoichiometric λ=1 or as needed for combustion through an open intake throttle 122. It should be understood that the implementation shown in FIG. 4 is exemplary, and other implementations are also contemplated.

Figure 5:
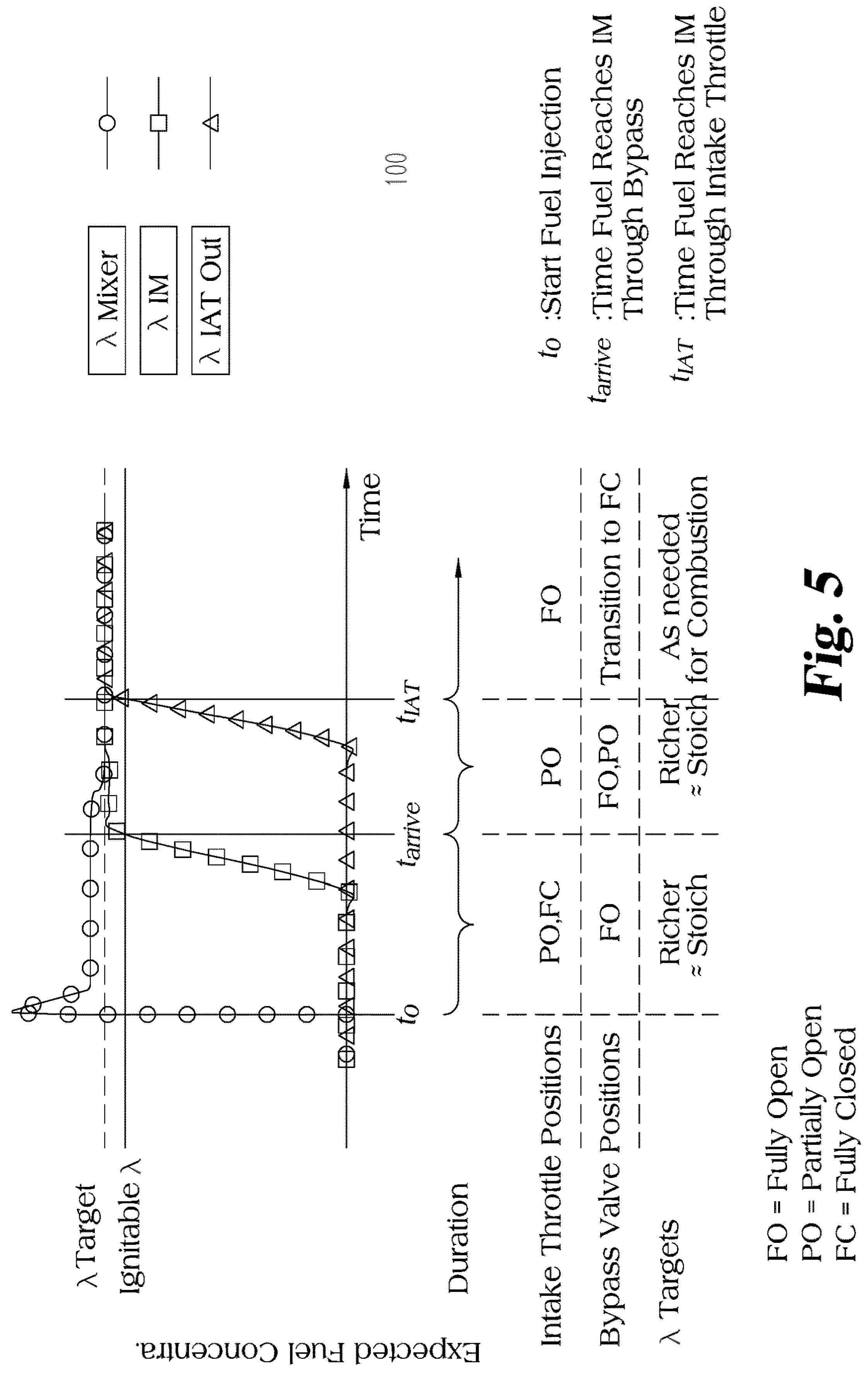
FIG. 5 is a graphical illustration of other embodiments of engine startup procedures utilizing a compressor bypass flow path.

FIG. 5 provides examples of a range of control strategies that can be implemented using system 100 for engine startup. For any control strategy or procedure, the fuel transport time is reduced using the bypass flow path 110 for initial fuel transport to the intake manifold 114, while maintaining the air-fuel ratio λ around target values to minimize misfire possibilities. FIG. 5 shows the expected air-fuel ratio over a time period that include time t0 at the start of fuel injection, time tarrive when the fuel reaches the intake manifold 114 through bypass flow path 112, and time tIAT for the fuel to reach the intake throttle 122.

FIG. 5 provide possible λ values at the mixer 108, intake manifold 114, and outlet of intake throttle 122 over the time periods t0, tarrive, and tIAT. Also shown are possible intake throttle and bypass valve positions over these time periods t0, tarrive, and tIAT. For example, intake throttle 122 can be initially positioned at a fully or partially closed condition from t0 to tarrive, and partially open from tarrive to tIAT, and then fully open after tIAT. Bypass valve 126 can be initially positioned at a fully open condition from t0 to tarrive, and fully or partially open from tarrive to tIAT, and then transition to fully closed after tIAT. The air-fuel ratio target can be richer or approximately stoichiometric from t0 to tarrive and from tarrive to tIAT, and then transition as needed for combustion of engine 102 after tIAT. It should be understood that the control strategies shown in FIG. 5 are exemplary, and other control strategies are also contemplated.

As is evident from the figures and text presented above, a variety of aspects according to the present disclosure are contemplated. According to one aspect, a method includes starting an internal combustion engine including an intake system and an air-fuel mixer connected to an intake manifold with first and second flow paths; while starting the internal combustion engine, directing an air-fuel mixture from the air-fuel mixer directly to the intake manifold through the second flow path to bypass a compressor and an intake throttle in the first flow path; and transitioning providing the air-fuel mixture to the intake manifold from the second flow path to the second flow path after the engine is started.

In one embodiment, the second flow path includes a bypass with a controllable bypass valve connecting the air-fuel mixer to the intake manifold. In one embodiment, starting the internal combustion engine includes providing the air-fuel mixture to the first flow path by opening the intake throttle and closing the bypass valve.

In one embodiment, starting the internal combustion engine includes opening the intake throttle and closing the bypass valve in response to an air-fuel ratio associated with the first flow path being within a predetermined range of an air-fuel ratio associated with the second flow path. In one embodiment, opening the intake throttle includes fulling opening the intake throttle and closing the bypass valve includes fully closing the bypass valve.

In one embodiment, providing the air-fuel mixture to the first flow path includes partially opening the intake throttle while the bypass valve is fully open to bleed air or the air-fuel mixture into the intake manifold through the intake throttle. In one embodiment, starting the internal combustion engine includes injecting an initial fuel amount to provide a first air-fuel ratio at the mixer and injecting a second fuel amount at the mixer to provide a reduced, second air-fuel ratio at the mixer after injecting the initial fuel amount.

In one embodiment, each of the first and second air-fuel ratios are less than a stoichiometric air-fuel ratio. In one embodiment, the method includes injecting a stoichiometric fuel amount at the mixer in response to an air-fuel ratio associated with the first flow path corresponding to an air-fuel ratio associated with the second flow path.

According to another aspect, an apparatus includes an electronic controller configured to determine a bypass valve command that controls a bypass valve actuator to position a bypass valve in a compressor bypass flow path of an internal combustion engine. The electronic controller is further configured to determine an intake throttle command that controls an intake throttle actuator to position an intake throttle in a compressor flow path of the internal combustion engine that includes a compressor. In response to an engine startup condition, the compressor bypass valve actuator is operable to position the compressor bypass valve in response to the compressor bypass valve command, and the intake throttle actuator is operable to position the intake throttle in response to the intake throttle command, to direct an air-fuel mixture from an air-fuel mixer directly to the intake manifold through the compressor bypass flow path while closing the compressor flow path.

In one embodiment, the compressor flow path includes a charge air cooler. In one embodiment, the electronic controller is configured to transition the air-fuel mixture from the compressor bypass flow path to the compressor flow path by opening the intake throttle with the intake throttle actuator in response to the intake throttle command and closing the bypass valve with the compressor bypass valve actuator in response to the bypass valve command.

In one embodiment, the electronic controller is configured to open the intake throttle and close the bypass valve in response to an air-fuel ratio associated with the compressor flow path being within a predetermined range of an air-fuel ratio associated with the compressor bypass flow path.

In one embodiment, the electronic controller is configured to transition the air-fuel mixture from the compressor bypass flow path to the compressor flow path by providing an intake throttle command to the intake throttle actuator to partially open the intake throttle while the bypass valve is fully open to bleed air into an intake manifold of the internal combustion engine.

In one embodiment, the electronic controller is configured to control an injector to inject an initial fuel amount to provide a first air-fuel ratio at the mixer and inject a second fuel amount at the mixer to provide a reduced, second air-fuel ratio at the mixer after injecting the initial fuel amount.

In one embodiment, each of the first and second air-fuel ratios are less than a stoichiometric air-fuel ratio. In one embodiment, the electronic controller is configured to inject a stoichiometric fuel amount at the mixer in response to an air-fuel ratio associated with the compressor flow path being within a predetermined range of an air-fuel ratio associated with the compressor bypass flow path.

According to another aspect, a system includes an internal combustion engine including an intake system with an air-fuel mixer. The air fuel mixer is connected to an intake manifold of the internal combustion engine by compressor flow path that includes a compressor and an intake throttle. The intake system further includes a compressor bypass flow path that includes a bypass valve and connects the air-fuel mixer with the intake manifold. The compressor bypass flow path bypasses the compressor and the intake throttle.

In one embodiment, the system includes a charge air cooler in the compressor flow path and the compressor bypass flow path bypasses the charge air cooler.

In one embodiment, the system includes an electronic controller configured to control the bypass valve and the intake throttle and, in response to an engine startup condition, the controller is configured to open the compressor bypass valve and close the intake throttle to direct an air-fuel mixture from the air-fuel mixer directly to the intake manifold through the compressor bypass flow path.

In one embodiment, the electronic controller is configured to transition the air-fuel mixture from the compressor bypass flow path to the compressor flow path by opening the intake throttle and closing the bypass valve.

While the invention has been illustrated and described in detail in the drawings and foregoing description, the same is to be considered as illustrative and not restrictive in character, it being understood that only certain example embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as “a,” “an,” “at least one,” or “at least one portion” are used there is no intention to limit the claim to only one item unless specifically stated to the contrary in the claim. When the language “at least a portion” and/or “a portion” is used the item can include a portion and/or the entire item unless specifically stated to the contrary.

What is claimed is:

1. A method, comprising:

starting an internal combustion engine including an intake system and an air-fuel mixer connected to an intake manifold with first and second flow paths;

while starting the internal combustion engine, directing an air-fuel mixture from the air-fuel mixer directly to the intake manifold through the second flow path to bypass a compressor and an intake throttle in the first flow path, and positioning the intake throttle in a closed position; and transitioning providing the air-fuel mixture to the intake manifold from the second flow path to the first flow path after the engine is started.

2. The method of claim 1, wherein the second flow path includes a bypass with a controllable bypass valve connecting the air-fuel mixer to the intake manifold.

3. The method of claim 2, wherein starting the internal combustion engine includes providing the air-fuel mixture to the first flow path by opening the intake throttle and closing the bypass valve.

4. The method of claim 3, wherein starting the internal combustion engine includes opening the intake throttle and closing the bypass valve in response to an air-fuel ratio associated with the first flow path being within a predetermined range of an air-fuel ratio associated with the second flow path.

5. The method of claim 4, wherein opening the intake throttle includes fully opening the intake throttle and closing the bypass valve includes fully closing the bypass valve.

6. The method of claim 3, wherein providing the air-fuel mixture to the first flow path includes partially opening the intake throttle while the bypass valve is fully open to bleed air or the air-fuel mixture into the intake manifold through the intake throttle.

7. The method of claim 3, wherein starting the internal combustion engine includes injecting an initial fuel amount to provide a first air-fuel ratio at the mixer and injecting a second fuel amount at the mixer to provide a reduced, second air-fuel ratio at the mixer after injecting the initial fuel amount.

8. The method of claim 7, wherein each of the first and second air-fuel ratios are less than a stoichiometric air-fuel ratio.

9. The method of claim 8, further comprising injecting a stoichiometric fuel amount at the mixer in response to an air-fuel ratio associated with the first flow path corresponding to an air-fuel ratio associated with the second flow path.

10. An apparatus, comprising:

an electronic controller configured to determine a compressor bypass valve command that controls a compressor bypass valve actuator to position a bypass valve in a compressor bypass flow path of an internal combustion engine, wherein the electronic controller is further configured to determine an intake throttle command that controls an intake throttle actuator to position an intake throttle in a compressor flow path of the internal combustion engine that includes a compressor; and wherein, in response to an engine startup condition, the compressor bypass valve actuator is operable to position the compressor bypass valve in response to the compressor bypass valve command, and the intake throttle actuator is operable to close the intake throttle in response to the intake throttle command, to direct an air-fuel mixture from an air-fuel mixer directly to the intake manifold through the compressor bypass flow path while closing the compressor flow path to bypass the compressor and the intake throttle in the compressor flow path.

11. The apparatus of claim 10, wherein the compressor flow path includes a charge air cooler.

12. The apparatus of claim 10, wherein the electronic controller is configured to transition the air-fuel mixture from the compressor bypass flow path to the compressor flow path by opening the intake throttle with the intake throttle actuator in response to the intake throttle command and closing the bypass valve with the compressor bypass valve actuator in response to the compressor bypass valve command.

13. The apparatus of claim 12, wherein the electronic controller is configured to open the intake throttle and close the bypass valve in response to an air-fuel ratio associated with the compressor flow path being within a predetermined range of an air-fuel ratio associated with the compressor bypass flow path.

14. The apparatus of claim 12, wherein the electronic controller is configured to transition the air-fuel mixture from the compressor bypass flow path to the compressor flow path by providing an intake throttle command to the intake throttle actuator to partially open the intake throttle while the bypass valve is fully open to bleed air into an intake manifold of the internal combustion engine.

15. The apparatus of claim 12, wherein the electronic controller is configured to control an injector to inject an initial fuel amount to provide a first air-fuel ratio at the mixer and inject a second fuel amount at the mixer to provide a reduced, second air-fuel ratio at the mixer after injecting the initial fuel amount.

16. The apparatus of claim 15, wherein each of the first and second air-fuel ratios are less than a stoichiometric air-fuel ratio.

17. The apparatus of claim 16, wherein the controller is configured to inject a stoichiometric fuel amount at the mixer in response to an air-fuel ratio associated with the compressor flow path being within a predetermined range of an air-fuel ratio associated with the compressor bypass flow path.

18. A system, comprising:

an internal combustion engine including an intake system with an air-fuel mixer, the air fuel mixer connected to an intake manifold of the internal combustion engine by compressor flow path that includes a compressor and an intake throttle, the intake system further including a compressor bypass flow path that includes a bypass valve and connects the air-fuel mixer with the intake manifold, wherein the compressor bypass flow path bypasses the compressor and the intake throttle; and an electronic controller configured to control the bypass valve and the intake throttle and, in response to an engine startup condition, the controller is configured to open the compressor bypass valve and close the intake throttle to direct an air-fuel mixture from the air-fuel mixer directly to the intake manifold through the compressor bypass flow path.

19. The system of claim 18, further comprising a charge air cooler in the compressor flow path and the compressor bypass flow path bypasses the charge air cooler.

20. The system of claim 18, wherein the electronic controller is configured to transition the air-fuel mixture from the compressor bypass flow path to the compressor flow path by opening the intake throttle and closing the bypass valve.

* * * * *